Figure 1:
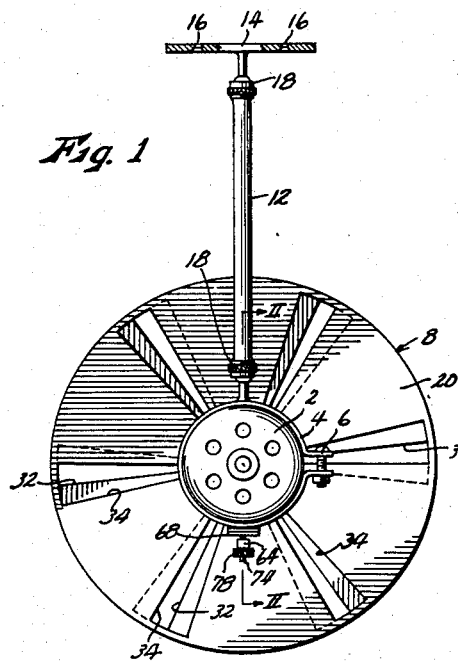

May 30, 1961     H. C. ETZENHOUSER     2,986,063
GLARE SHIELD
Filed Jan. 12, 1959

INVENTOR.
Harold C. Etzenhouser
BY John A. Hamilton
Attorney.

United States Patent Office 2,986,063
Patented May 30, 1961

2,986,063
GLARE SHIELD
Harold C. Etzenhouser, 6020 N. Topping,
Kansas City 19, Mo.
Filed Jan. 12, 1959, Ser. No. 786,335
1 Claim. (Cl. 88—1)

This invention relates to new and useful improvements in glare shields and has particular reference to glare shields of the type suitable for installation in automobiles to protect the driver from the glare of sunlight, excessively brilliant headlamps of approaching automobiles, and the like, although it will be readily apparent that my device is applicable wherever a glare shield is desired.

Basically, my invention relates to a glare shield of the type comprising a rapidly revolving opaque disc in which is formed a series of angularly spaced radial slots, said disc being supported in the line of sight of the driver so that he views the road therethrough. Due to the physiological phenomenon known as the persistence of vision, whereby the image obtained through a slot of the disc will continue in the driver's consciousness until the scene is again exposed through the next slot of the disc, the revolving disc will appear to be transparent. However, the light intensity of the image viewed through the disc will be reduced in the same ratio that the total angular extent of the opaque portions of the disc bears to the total angular extent of the slots of the disc, and any excessive brightness or glare is eliminated. In other words, the narrower the slots, the dimmer the view obtained through the disc. The degree of dimming is not appreciably affected by the rotational speed of the disc, since the ratio of the slot widths to the opaque portions remains constant regardless of speed. A disadvantage of all previous glare shields of this type within my knowledge has been that they provide a fixed degree of reduction of the light intensity of the viewed image, and are not adjustable in this respect. Hence the devices could not be adjusted to the individual preferences of different users, or to variable conditions such as day or night driving, or to compensate for varying intensities of the source of light or glare being shielded against. The primary object of the present invention is, therefore, the provision of a glare shield of the class described having means whereby the apparent density of the shield, and the degree of light reduction provided thereby, may be quickly and easily adjusted. Generally, this object is accomplished by a means for adjusting the angular extent of the slots in the opaque disc as described.

Another object is the provision of a glare shield wherein the adjustment as described above may be performed while the disc is rotating at full speed, so that adjustments may be made almost instantly to compensate for rapidly changeable conditions of light or glare encountered on the road.

Other objects are simplicity and economy of construction, efficiency and dependability of operation, and adaptability for use in a wide variety of applications.

Figure 2:
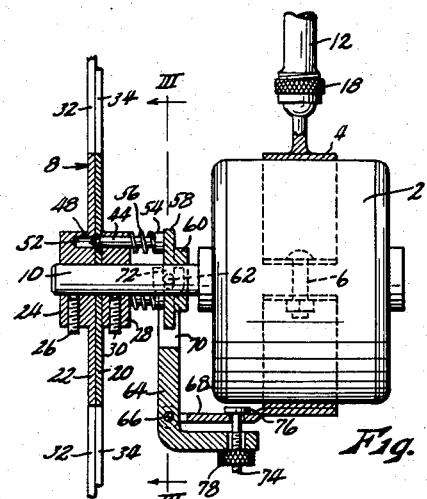
Figure 3:
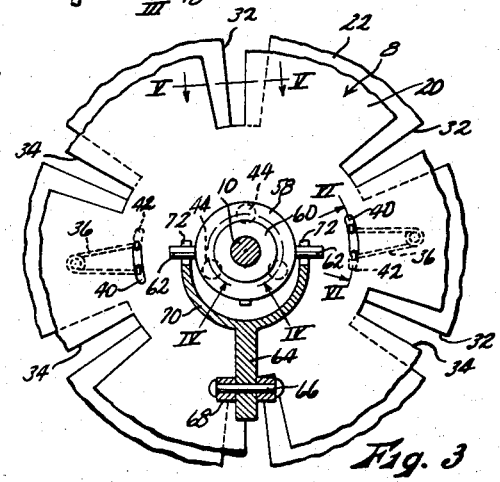
Figure 5:
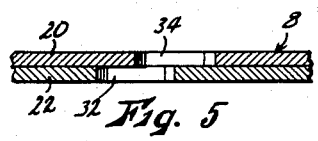
Figure 6:
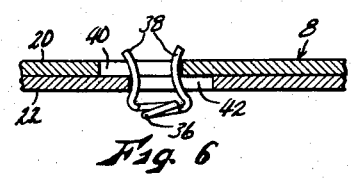
Figure 4:
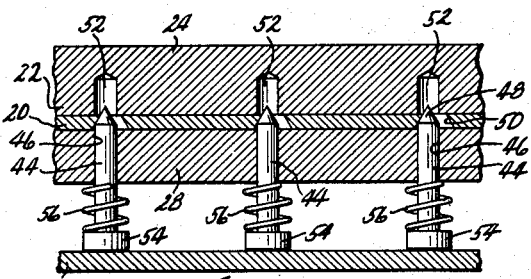

With these objects in view, as well as other objects which will appear in the course of the specification, reference will be had to the drawing, wherein:

Fig. 1 is a rear elevational view of a glare shield embodying the present invention, partially broken away, Fig. 2 is an enlarged, fragmentary sectional view taken on line II—II of Fig. 1, with parts left in elevation, Fig. 3 is a sectional view taken on line III—III of Fig. 2, with parts left in elevation, Fig. 4 is an enlarged, fragmentary laid-out sectional view taken on curved line IV—IV of Fig. 3, and Figs. 5 and 6 are enlarged fragmentary sectional views taken respectively on lines V—V and VI—VI of Fig. 3.

Like reference numerals apply to similar parts throughout the several views, and the numeral 2 applies to an electric motor supported by a clamp ring 4 disposed thereabout and tightened by a bolt 6. The circular, disc-like glare shield is indicated generally by the numeral 8 and is supported on the output shaft 10 of motor 2. Clamp ring 4 is supported by an arm 12 welded or otherwise fixed at one end to said clamp ring, and at its opposite end to a mounting plate 14 provided with screw holes 16. Said mounting plate may be affixed to the upper frame of the windshield of an automobile, or to the dashboard ledge just below the windshield, or to the front left hand door frame, or to any other suitable portion of an automobile so as to support shield 8 in the line of sight of the driver, the plane of the shield being arranged normally to said line of sight while in use. Arm 12 is provided with a universal joint 18 adjacent each end thereof, whereby the shield may be moved out of the driver's field of vision when it is not in use. Clamp ring 4 and arm 12 form what may be designated as a frame supporting motor 2 and drive shaft 10.

Glare shield 8 is of composite structure, comprising a pair of planar, circular discs 20 and 22 in face-to-face sliding contact. Disc 22 is provided with a central hub 24 secured fixedly on shaft 10 by a set screw 26. Disc 20 is mounted rotatably on shaft 10, and is held against disc 22 by a collar 28 fixed on shaft 10 by a set screw 30. Formed in disc 22 are a series of radially extending, segmentally shaped slots 32, said slots being spaced at regular intervals and terminating at their outer ends just short of the peripheral edge of the disc. Disc 20 has a matching series of slots 34 formed therein.

It will be apparent that if motor 2 is energized to rotate the glare shield while the slots 32 and 34 are in registering relation, the screen will appear transparent to the driver due to persistence of vision, as previously described, but that the light intensity will be reduced in the same ratio that the angular extent of the slots bears to the angular extent of the disc portion between the slots. The discs are of course formed of opaque or at least semi-opaque material. This ratio is maintained uniform throughout the viewing area by forming the slots in tapered shape, the longitudinal edges thereof being exactly radial to the discs. It will be apparent also that this ratio, and hence the intensity of the image, may be reduced by turning the discs 20 and 22 relative to each other so that slots 32 and 34 lie in only partially overlapping relation, as shown in Figs. 1 and 3, thereby reducing the effective widths of said slots. This adjustment and the mechanism for performing it, form the special subject matter of this invention.

Disc 20 is urged rotatively relative to disc 22 by a pair of substantially U-shaped springs 36 lying alongside the forward face of disc 22, and each having its end portions 38 (see Fig. 6) bent to project through a pair of matching slots 40 and 42 formed respectively in discs 20 and 22. It will be seen that when said springs are fully expanded to bring slots 40 and 42 into registering relation, slots 32 and 34 will also be in registering relation, and that slots 32 and 34 can be moved into partially overlapping relation only by compressing said springs.

A plurality of cam pins 44 are carried for longitudinal sliding movement in bores 46 (see Fig. 4) provided therefor in collar 28. Said pins are parallel to motor shaft 10, and are disposed in regularly spaced relation thereabout. At its forward end, each pin 44 is provided with a tapered tip 18 which is disposed in a tapered hole 50 formed in disc 20. It will therefore be apparent that when pins 44 are urged forwardly, the tapered tips 48 thereof will engage the tapered walls of holes 50 and, acting as cams, force disc 20 to turn slightly in a counter-clockwise direction relative to disc 22, as viewed in Fig. 3, thereby moving slots 34 of disc 20 into only partially overlapping relation with slots 32 of disc 22, against the pressure of springs 36. The degree to which disc 20 is turned, and hence the final relationship of slots 32 and 34, depends on the degree to which pins 44 are advanced. Whenever pins 44 are retracted rearwardly, springs 36 move disc 20 back to its normal position relative to disc 22. Hub 24 of disc 22 is provided with a socket 52 in axial alignment with each of bores 46 for receiving the portions of pins 44 which extend through the forward face of disc 20.

The rearward portion of each cam pin 44 extends outwardly from collar 28, and is provided at its extreme rearward end with an enlarged head 54. A coil spring 56 is disposed about the extended portion of pin 44, bearing at its one end against head 54, and at its opposite end against collar 28. Said springs urge said pins rearwardly toward their retracted positions at all times. The heads 54 of pins 44 bear slidably against the forward face of a pusher ring 58 which is mounted for free rotation on motor shaft 10, said pusher ring having a hub 60, and having a pair of diametrically opposite radially extending trunnions 62 affixed in the peripheral edge thereof.

A cam operating lever 64 is pivoted, as at 66, to the forward end of an arm 68 which is welded or otherwise fixed at its forward end to the lower portion of clamp ring 4. Lever 64 extends upwardly toward motor shaft 10, and is provided at its upper end with an integral yoke 70 which embraces pusher ring 58. The ends of the yoke arms are each forked as at 72 to engage the trunnions 62 respectively, whereby to secure the pusher ring against rotation with motor shaft 10. The portion of lever 64 below pivot 66 is angled to extend forwardly beneath arm 68, and is connected to said arm by a bolt 74 extending through holes provided therefor in said lever and said arm. The head 76 of said bolt is disposed over arm 68, and a knurled nut 78 is threaded on the bolt below lever 64.

It will be readily apparent that by advancing nut 78 upwardly, the driver may actuate lever 64 to force pusher ring 58 forwardly, and that said pusher ring will urge cam pins 44 forwardly against the pressure of springs 56 to cause said pins to turn disc 20 relative to disc 22 as previously described. In this manner, the slots 34 and 32 may be moved relatively so that they overlap each other to a lesser and lesser extent, thereby increasing the density of the shield formed by said discs by decreasing the amount of light transmitted therethrough. If nut 78 is moved downwardly along the bolt, springs 56 and 36 will function respectively to retract pins 44 and to turn disc 20 so that slots 34 and 32 overlap to a greater and greater extent, thereby decreasing the shield density by increasing the light transmitted thereby. In this manner, the glare shield may be adjusted to the individual preferences of different drivers, and to varying driving conditions. Moreover, the adjustment may be made quickly and easily even while the shield is rotating at full motor speed when desired, due to the rotatable interconnection between cam pins 44 and pusher ring 58. This greatly increases the ease and efficiency of usage of the device, since adjustments may be made almost instantly to meet rapidly changing or momentary conditions such as a momentary flash of sunlight when negotiating a curve, or the variable light intensity of approaching headlamps in night driving. If adjustment required stoppage of rotation of the shield, the need for the adjustment would often have passed before it could be accomplished.

While I have shown and described a specific embodiment of my invention, it will be readily apparent that many changes of structure and operation could be made without departing from the spirit of the invention as defined by the scope of the appended claim.

What I claim as new and desire to protect by Letters Patent is:

A glare shield comprising a supporting frame, a shaft carried for rotation by said frame, means carried by said frame and operable to rotate said shaft, a first planar disc fixed to said shaft and having a series of radially extending slots formed therein, a second disc carried rotatably on said shaft, said second disc overlying said first disc and having a matching series of radially extending slots formed therein, spring means urging said discs rotatively relative to each other to move the slots of the respective disc into registering relation, a cam supporting member fixed to said shaft, a cam consisting of an elongated pin parallel to said shaft carried by said supporting member for movement longitudinally of said shaft, said cam pin having a tapered point engaging in a hole formed therefor in said second disc in spaced apart relation from the axis thereof, said pin being out of axial alignment with said hole when the slots of the respective discs are registered with each other, whereby when said cam pin is urged toward said second disc to force the tapered point thereof more deeply into said hole, said second disc will be turned angularly relative to said first disc to move the slots of said discs out of registering relation, an actuating member mounted on said shaft whereby said shaft may rotate freely therein, and slidable on said shaft whereby to engage and move said cam, said cam slidably engaging a surface of said actuating member at right angles to the axis of said shaft, and means carried by said frame and engaging said actuating member, said last named means being operable to move said actuating member slidably along said shaft.

References Cited in the file of this patent

UNITED STATES PATENTS

| | | |
|---|---|---|
| 1,362,199 | Stringham | Dec. 14, 1920 |
| 1,525,346 | Warren | Feb. 3, 1925 |
| 1,860,824 | Tate | May 31, 1932 |
| 1,860,967 | Tate | May 31, 1932 |
| 1,959,044 | Wallace | May 15, 1934 |
| 2,166,947 | Fayerweather | July 25, 1939 |
| 2,441,887 | Kopp | May 18, 1948 |
| 2,445,288 | Broido et al. | July 13, 1948 |
| 2,478,598 | Somers | Aug. 9, 1949 |

FOREIGN PATENTS

| | | |
|---|---|---|
| 503,449 | Great Britain | Apr. 6, 1939 |